Patented Oct. 11, 1932

1,882,437

UNITED STATES PATENT OFFICE

WILLIAM T. MacLEESTER, OF PHILADELPHIA, PENNSYLVANIA

MANUFACTURE OF MONOMETHYL-PARA-AMINO-PHENOL AND ITS SULPHATE

No Drawing.   Application filed March 25, 1925.   Serial No. 18,168.

My invention is a process for the preparation of mono-methyl - para - aminophenol, commonly known as methol, by the decomposition of para-hydroxyphenylglycine and for the conversion of such base into its sulphate with the formation of monomethyl-para-aminophenol sulphate.

My invention involves the lowering of the melting point of the para-hydroxyphenylglycine to facilitate its decomposition and the protection of the monomethyl-para-aminophenol base from oxidation. In the practice of my invention, decomposition of para-hydroxyphenylglycine is effected by heating in the presence of a medium which acts as a solvent therefor; such medium being, preferably, also a solvent for the resulting monomethyl-para-aminophenol base. The base may be extracted from the solvent and simultaneously converted to the sulphate form by the addition of sulphuric acid without danger of discoloration by oxidation. The mediums which I have successfully used have melting points below the normal melting point of para-hydroxyphenylglycine, are stable at the temperature at which the para-hydroxyphenylglycine decomposes therein, and are chemically inert relatively to the para-hydroxyphenylglycine and preferably relatively to the monomethyl-para-aminophenol base. The heating is continued until the para-hydroxyphenylglycine is completely decomposed, when the $CO_2$ resulting from the decomposition ceases to be given off.

The mediums which I have found preferable because of their actions as solvents of both the para-hydroxyphenylglycine and the monomethyl-para-aminophenol are hydroxyl derivatives of the aromatic series of hydrocarbons, particularly compounds having an hydroxyl group linked directly to the benzene nucleus and characterized by the presence of a methyl group and preferably having a plurality of aliphatic radicals replacing corresponding hydrogen molecules of the benzene ring such as the xylenols, thymol, carvacrol, I may also use benzaldehyde.

In the preferred practice of my invention, I heat the para-hydroxyphenylglycine with an excess (about ten times its weight) of the protective medium at a temperature of from 165 to 170 degrees C. at atmospheric pressure at sea level. The resulting solution of mono-methyl-para-aminophenol is cooled to room temperature (20 to 25 degrees C.) to minimize sulphonating of the medium when sulphuric acid is added.

The solution of monomethyl-para-aminophenol as above can be extracted from the solution with water and converted to the sulphate by the addition of an equivalent amount of sulphuric acid, or the base can be converted to the sulphate in the protective medium by the addition of an equivalent quantity of sulphuric acid and the precipitated sulphate separated by extracting with water or preferably by filtration.

Having described my invention, I claim:

1. In the process of manufacturing monomethyl-para-amino-phenol the steps which comprise lowering the melting point of parahydroxyphenylglycine by a medium preventing oxidation of monomethyl-para-amino-phenol base, and decomposing such para-hydroxyphenylglycine by heat into monomethyl-para-amino-phenol base and forming a salt from such base while excluding oxygen therefrom by means of the solvent.

2. The process of manufacturing monomethyl para-aminophenol sulphate which comprises decomposing para-hydroxy-phenylglycine into monomethyl para-aminophenol in an inert solvent and simultaneously extracting and sulphating by means of sulphuric acid the monomethyl para-aminophenol base.

3. The process of manufacturing monomethyl-para-aminophenol sulphate which comprises heating para-hydroxyphenylglycine in a non-oxidizing solvent and agitating the solution with sulphuric acid.

4. In the process of manufacturing monomethyl-para-aminophenol sulphate, the step of simultaneously extracting and sulphating monomethyl-para-aminophenol base from an hydroxyl derivative of the aromatic series of hydrocarbons by agitation with dilute sulphuric acid.

5. The process of manufacturing monomethyl-para-aminophenol sulphate which comprises decomposing para-hydroxyphenylglycine in a non-oxidizing solvent sulphating and precipitating the monomethyl-para-aminophenol by the addition of sulphuric acid to the solution, and separating the precipitated monomethyl-para-aminophenol sulphate.

6. The process of manufacturing monomethyl-para-aminophenol which comprises heating para-hydroxyphenylglycine in a medium which is a non-oxidizing solvent for para-hydroxyphenylglycine and for monomethyl-para-aminophenol, such medium being stable at the temperature at which the para-hydroxyphenylglycine decomposes therein, having a melting point below that of the para-hydroxyphenylglycine dissolved therein and being inert relatively thereto and to monomethyl-para-aminophenol.

7. The process of manufacturing monomethyl-para-aminophenol which comprises lowering the normal melting point of para-hydroxyphenylglycine by a hydroxyl derivative of the aromatic series of hydrocarbons having a hydroxyl group linked directly to the benzene ring, and characterized by the presence of a methyl group and decomposing the para-hydroxyphenylglycine by heat into monomethyl-para-aminophenol base, and forming a salt from such base while excluding oxygen therefrom by an inert liquid.

8. The process of manufacturing monomethyl-para-aminophenol sulphate which comprises decomposing para-hydroxyphenylglycine into monomethyl-para-aminophenol in a hydroxyl derivative of the aromatic series of hydrocarbons having a hydroxyl group linked directly to the benzene ring and characterized by the presence of a methyl group and simultaneously extracting and sulphating by sulphuric acid the monomethyl-para-aminophenol base.

9. The process of manufacturing monomethyl-para-aminophenol sulphate which comprises heating para-hydroxyphenylglycine in a hydroxyl derivative of the aromatic series of hydrocarbons, having a hydroxyl group linked directly to the benzene ring and characterized by the presence of a methyl group and agitating the solution with sulphuric acid.

10. In the process of manufacturing monomethyl-para-aminophenol sulphate the steps of simultaneously extracting monomethyl-para-aminophenol base from a hydroxyl derivative of the aromatic series of hydrocarbons having a hydroxyl group linked directly to the benzene ring and characterized by the presence of a methyl group and sulphating and precipitating in the hydroxyl derivative such base by agitation with sulphuric acid.

11. The process of manufacturing monomethyl-para-aminophenol sulphate which comprises decomposing para-hydroxyphenylglycine in a hydroxyl derivative of the aromatic series of hydrocarbons having a hydroxyl group linked directly to the benzene ring and characterized by the presence of a methyl group and having a plurality of aliphatic radicals replacing corresponding hydrogen molecules of the benzene ring, sulphating and precipitating the monomethyl-para-aminophenol by the addition of sulphuric acid to the solution, and separating the precipitated monomethyl-para-aminophenol sulphate.

12. The process of manufacturing monomethyl-para-aminophenol which comprises heating para-hydroxyphenylglycine into a medium consisting of a hydroxyl derivative of the aromatic series of hydrocarbons having a hydroxyl group linked directly to the benzene ring and characterized by the presence of a methyl group and having a plurality of aliphatic radicals replacing corresponding hydrogen molecules of the benzene ring, such medium being stable at the temperature at which para-hydroxyphenylglycine decomposes therein, said medium having a melting point below that of the para-hydroxyphenylglycine dissolved therein and being inert relatively thereto and to monomethyl-para-aminophenol.

13. The process of manufacturing monomethyl-para-aminophenol sulphate which comprises decomposing para-hydroxyphenylglycine by heating in the presence of a medium which acts as a solvent therefor and forms a solvent for the resulting monomethyl-para-aminophenol base, such solvent having a melting point below the normal melting point of para-hydroxyphenylglycine, being chemically inert relatively to the para-hydroxyphenylglycine, and being stable at a temperature at which para-hydroxyphenylglycine decomposes; sulphating by sulphuric acid the monomethyl-para-aminophenol base while in the medium and filtering out the sulphated base from the medium.

Signed at Philadelphia, in the county of Philadelphia, and State of Pennsylvania, this 18 day of March, 1925.

WILLIAM T. MacLEESTER.